United States Patent [19]
Cyphers et al.

[11] Patent Number: 5,671,656
[45] Date of Patent: Sep. 30, 1997

[54] PAINT PUMP FLUID SECTION

[75] Inventors: Norman A. Cyphers, Rogers; Frank G. Mirazita, Coon Rapids, both of Minn.

[73] Assignee: Wagner Spray Tech Corporation, Minneapolis, Minn.

[21] Appl. No.: 594,025

[22] Filed: Feb. 20, 1996

[51] Int. Cl.[6] .................................................. F16J 1/00
[52] U.S. Cl. .............................. 92/172; 92/261; 92/168; 417/DIG. 1
[58] Field of Search ........................... 417/454, DIG. 1; 92/172, 222, 240, 168; 272/187

[56] References Cited

U.S. PATENT DOCUMENTS

| | | |
|---|---|---|
| 3,011,808 | 12/1961 | Tucker . |
| 3,069,178 | 12/1962 | Rosen . |
| 3,330,217 | 7/1967 | Baur . |
| 3,920,253 | 11/1975 | Bauer .................. 277/187 |
| 4,009,971 | 3/1977 | Krohn . |
| 4,331,339 | 5/1982 | Reinsma .................. 277/84 |
| 4,359,228 | 11/1982 | Cather .................. 277/1 |
| 4,447,195 | 5/1984 | Schuck .................. 417/570 |
| 4,706,970 | 11/1987 | Ramirez .................. 277/188 R |
| 5,163,692 | 11/1992 | Schofield et al. .................. 277/153 |
| 5,211,611 | 5/1993 | Lammers . |
| 5,346,037 | 9/1994 | Flaig .................. 184/24 |
| 5,435,697 | 7/1995 | Guebeli . |
| 5,456,583 | 10/1995 | Handzel .................. 417/454 |

FOREIGN PATENT DOCUMENTS

| | | | |
|---|---|---|---|
| 91 10 799 | 10/1991 | Germany | .................. F16J 15/02 |
| 2 287 758 | 9/1995 | United Kingdom | .................. F04B 53/02 |

OTHER PUBLICATIONS

Graco Instructions–Parts List 308–548, 390sts Airlines Paint Sprayer;1994 Minneapolis, MN.
Glidden Operation Manual and Parts List for Power Pup 4 & 5; Dec. 1993, Moorpark, CA.
Titan Owners Manual 313–006, Epic 440e; 1994 Oakland, NJ.

*Primary Examiner*—Thomas E. Denion
*Attorney, Agent, or Firm*—Faegre & Benson

[57] ABSTRACT

An improved fluid section for piston type paint pumps having the piston made from unplated stainless steel and wherein the seal is a multiple lip type formed of ultra-high molecular weight polyethylene and the seal further includes one or more U-shaped internal stainless steel springs.

9 Claims, 3 Drawing Sheets

PAINT PUMP FLUID SECTION

FIELD OF THE INVENTION

This invention relates to the field of portable airless painting equipment, more particularly, to piston-type pumps for such applications.

BACKGROUND OF THE INVENTION

In the past, piston paint pumps for airless spray painting equipment typically used a piston formed of conventional steel which was then plated with chrome. In assembly, such a chrome-plated piston was sealed to a fluid section housing using either V-ring packing sets or engineered plastic back-to-back single lip-type seals. Such an arrangement has yielded a measure of success with the chrome plating being resistant to wear from the highly abrasive liquid paint being pumped. Chrome-plated pistons, however, suffer from an inherent drawback in that when the chrome plating initially wears through, the remaining plating delaminates or "peels back" from the steel, causing catastrophic seal failure, typically by "lacerating" the seal with the delaminated remaining portion of the plating.

In connection with the present invention it has been found that an uncoated stainless steel piston along with a multiple lip (i.e., more than one lip and preferably a triple-lip) seal formed of ultra-high molecular weight polyethylene results in substantially the same life for the piston with substantially reduced cost as compared to a piston plated with a conventional thickness (e.g., 0.004 to 0.006 inches) of chrome. In addition, eliminating the chrome plating eliminates the characteristic destruction of the seal when the chrome plating wears through and delaminates. The piston and seal of the present invention wear gradually, causing a progressive, relatively slowly increasing leakage after sufficient clearance occurs between the seal and the piston, thus avoiding the sudden or catastrophic destruction of the seal. This allows the painter to continue to paint (albeit with some leakage) until it is convenient to service the fluid section, in contrast to the seal destruction that occurs with plated pistons necessating immediate repair. Furthermore, chrome plating has been found to result in hydrogen embrittlement of the piston unless the plated part is immediately heat treated to relieve it, and thus the elimination of chrome plating removes an additional process step and its consequent cost. Moreover, using stainless steel eliminates the post-plating grinding step previously required to complete processing of plated pistons.

A side benefit of lip-type seals is the elimination of the requirement to provide and control an axial preload as is required for proper operation of V-ring packing sets. The lips on such lip-type seals allow a "non-press" fit for the seal which avoids distortion of the seal upon installation.

DETAILED DESCRIPTION OF THE INVENTION

Figure 1:
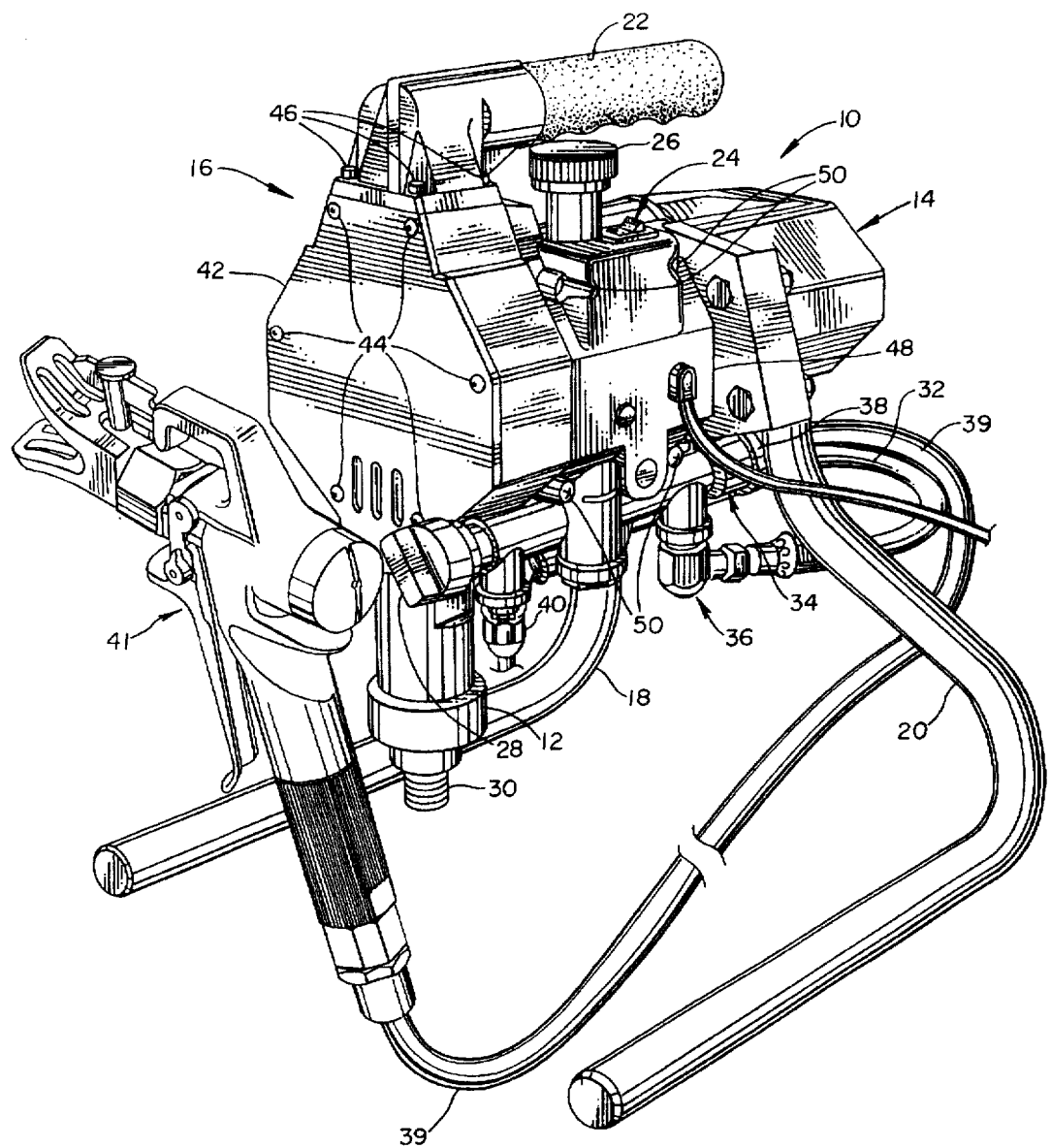
FIG. 1 is a perspective view of a paint pump and spray gun showing the fluid section of the present invention.

Referring now to the Figures, and most particularly to FIG. 1, a perspective view of a pump assembly 10 useful in the practice of the present invention may be seen. Pump assembly 10 includes a fluid section 12 driven by an electric motor (not shown) enclosed by housing 14. The motor powers a gear box in housing 16 which also has a rotary to linear motion converting mechanism such as a Scotch yoke contained therein to provide reciprocating linear motion to drive the fluid section 12. Pump 10 preferably has a pair of feet or supports 18, 20 and a handle 22 for portability of the pump 10. Pump 12 further preferably has an on/off switch 24, a pressure setting knob 26, and a priming control 28. In operation paint is drawn into an inlet 30 of the fluid section, and raised to a relatively high pressure of about 2000–3000 p.s.i. Pressurized paint is supplied by the fluid section 12 via a hose 32 to a fluid manifold 34 via a fluid coupling 36. The fluid manifold 34 has a paint outlet 38 connected to another fluid hose 39 similar to hose 32 which, in turn, is connected to a hand-held paint spray gun 41 for application of paint to a surface to be coated. Priming control 28 allows paint to be delivered to a bypass line 40 during priming and also in the event of an overpressure situation, since the priming control 28 also functions as an overpressure relief valve for fluid manifold 34.

Housing 16 preferably has a cover 42 secured by a plurality of fasteners 44. Similarly, handle 22 is secured to housing 16 by fasteners 46. A pressure control cover 48 is preferably formed integrally with the fluid manifold 34 from a single aluminum die casting and is secured to housing 16 by a plurality of conventional threaded fasteners (not shown) received in recesses 50.

Figure 2:
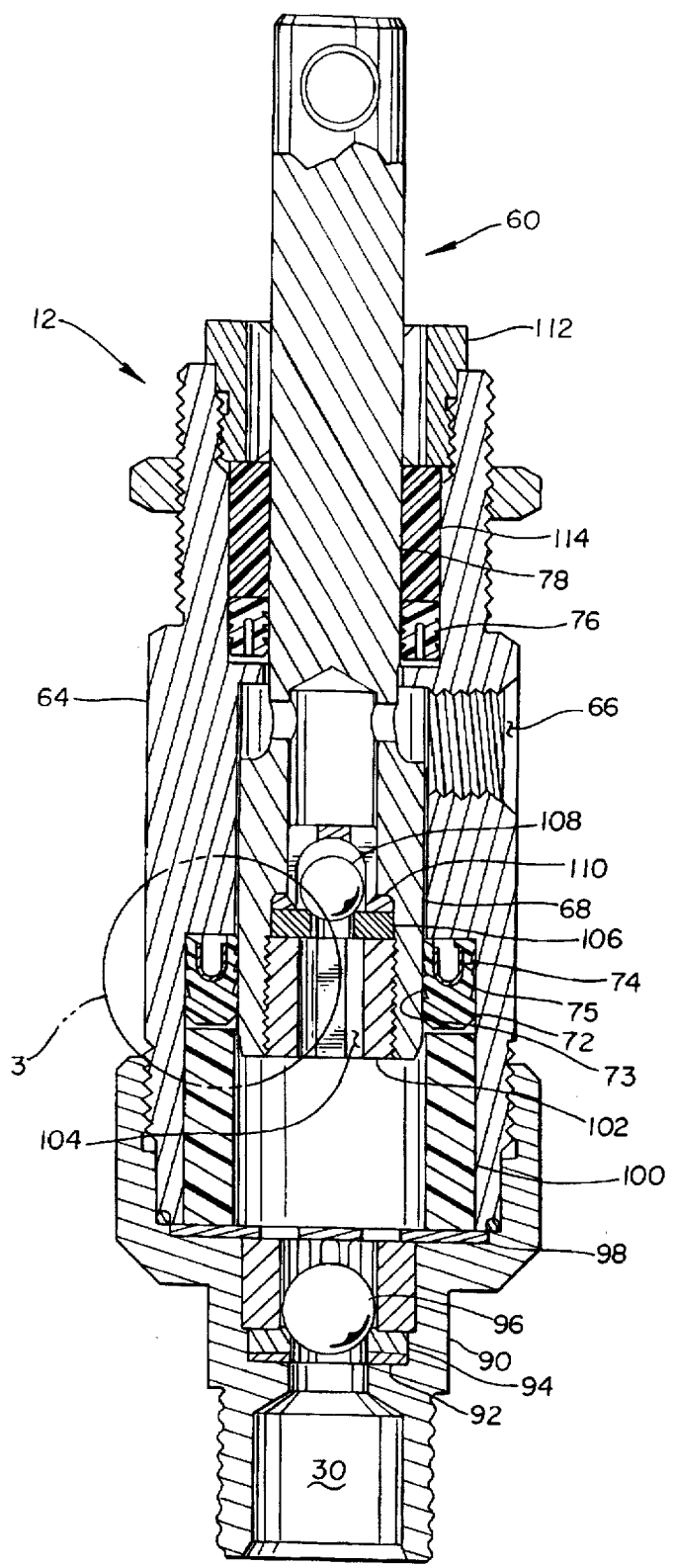
FIG. 2 is a section view of the fluid section shown in FIG. 1 including a stainless steel piston and triple lip inlet and outlet seals useful in the practice of the present invention.
Figure 3:
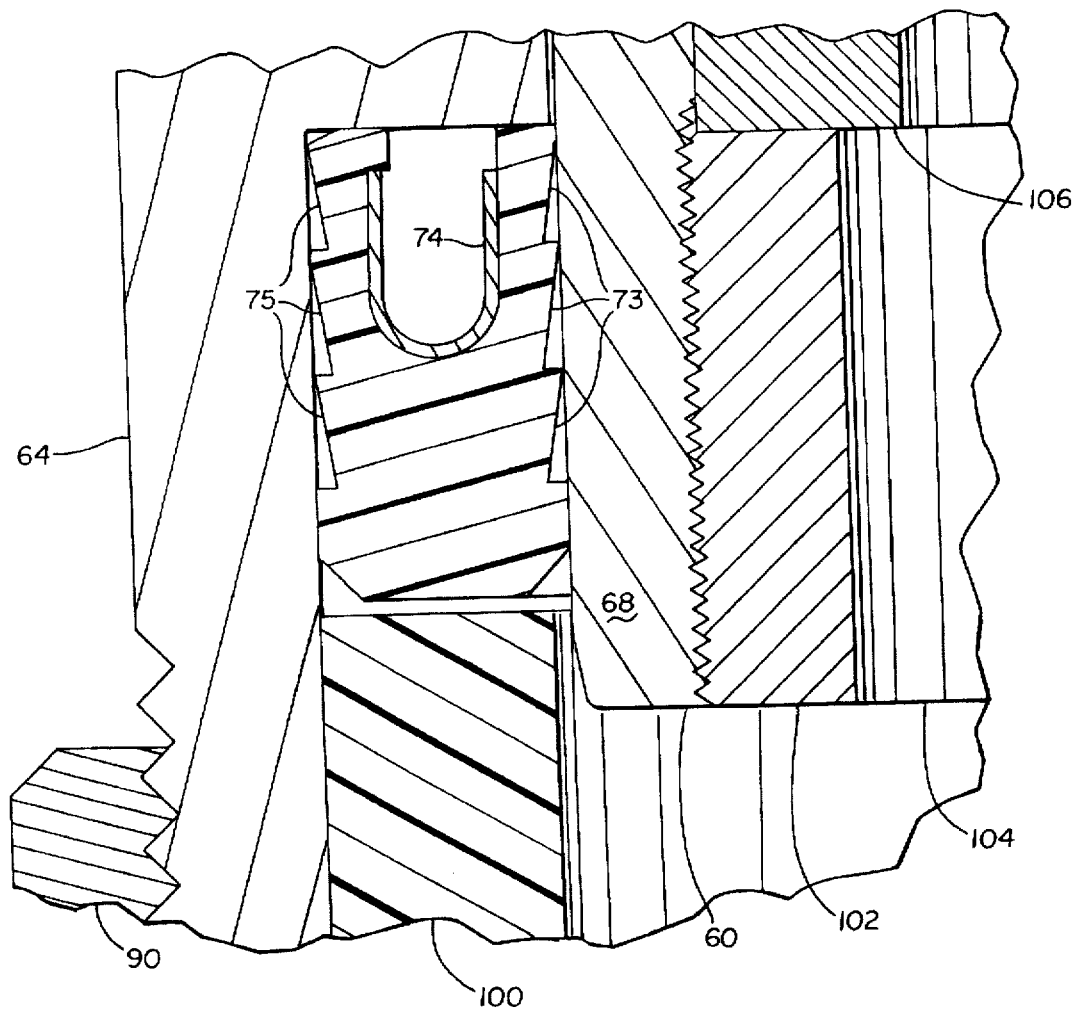
FIG. 3 is an enlarged fragmentary section view of the region of the fluid section of FIG. 2 showing the triple lip seal and a portion of the adjacent piston.
Figure 4:
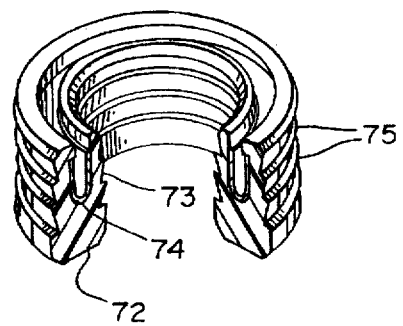
FIG. 4 is a cutaway view of a triple lip seal and spring energizer useful in the practice of the present invention.

Referring now also to FIGS. 2, the fluid section 12 useful in the practice of the present invention may be seen in more detail. Fluid section 12 includes a piston 60 carried in a housing 64 for pumping paint from an inlet 30 to an outlet 66, developing pressures of up to approximately 3000 psi. Piston 60 is preferably made of type 440C stainless steel. The lower end 68 of piston 60 is secured against leakage by a triple lip seal 72, preferably formed of ultra high molecular weight polyethylene (UHMWPE) and also includes one or more (and preferably two) stainless steel springs or energizers 74 having a U-shaped cross section when installed in the seal to urge the lips of the seal in the radial direction. Referring now also to FIGS. 3 and 4, the radially inward lips 73 are urged radially inwardly, while the radially outward lips 75 are urged radially outwardly by energizer springs 74. A second triple lip seal 76 seals the upper end 78 of piston 60 against housing 64. It is to be understood that lower seal 72 is located between the inlet chamber 30 and the outlet chamber 66, while upper seal 76 is between the outlet chamber 66 and the external environment of the fluid section 12. Seal 76 is to be understood to be the same as seal 72, except for size and possibly the number of energizers present.

It is to be understood that all types of coating materials are able to be pumped with the present invention, including, but not limited to, latex and oil-based paints, lacquers, varnishes, stains, thixotropic coatings, and the like. Operating pressures from about 500 to about 3000 psi at flow rates of about 0.2 to greater than 1.0 GPM can be achieved with the present invention. In the practice of the present invention, it has been found preferable to finish the piston to about 8 to about 12 microinches initial surface finish, although values outside this range are believed to still be within the scope of the present invention, e.g., 5 to 32 micro inches are believed to be acceptable to achieve certain advantages of the present invention, particularly with the knowledge that many paints are highly abrasive and will polish the piston to a finer finish in operation. It is to be further understood that the present invention can be distinguished from those piston and seal arrangements using lubricating fluids such as hydraulic oil (which are not abrasive), and other applications where the cycle rate is substantially lower than the typical 235 cycles per minute minimum for the paint pumping application of the present invention. Such other applications, such as hydraulic jacks, do not face the same extreme wear conditions facing the present invention.

Referring now again to FIG. 2, fluid section 12 also preferably has a nickel-plated inlet valve holder 90, a valve seal 92, a carbide valve seat 94, and a 440C stainless steel ball 96. Ball 96 is retained by a perforated, zinc-plated steel ball stop disk 98.

A Delrin lower spacer 100 positions the lower seal 72 within the nickel-plated steel housing 64 with axial dimensions sized to prevent any axial loading of seal 72, even with tolerance build-up in the spacer, seal and housing.

A piston seat retainer 102 is preferably formed of 303 type stainless steel and has a bore 104 therethrough having a hexagonal cross section to permit installation and removal with a conventional Allen wrench. Retainer 102 holds a carbide upper valve seat 106 and a type 440C stainless steel ball 108 in a nylon ball retainer or cage 110.

A locknut 112 holds an upper spacer 114 to position upper seal 76 similarly to the arrangement for lower seal 72. It is to be understood that locknut 112 also operates as a piston guide at the location where the piston exits the housing to maintain concentricity between the piston and the housing.

The invention is not to be taken as limited to all of the details thereof as modifications and variations thereof may be made without departing from the spirit or scope of the invention.

What is claimed is:

1. In a piston paint pump fluid section of the type having a piston carried in a housing and secured against leakage from an inlet chamber to an outlet chamber by an inlet seal located between the piston and the housing, the improvement in combination therewith comprising the piston being formed of unplated stainless steel and the inlet seal being a first multiple lip seal formed of a resilient elastomer material.

2. The improved fluid section of claim 1 wherein the elastomer material further comprises an ultra high molecular weight polyethylene.

3. The improved fluid section of claim 1 wherein the fluid section is further of the type having an outlet seal located between the piston and the housing to secure the fluid section against leakage from the outlet chamber of the fluid section to an external environment of the fluid section, the improvement further comprising a second multiple lip seal formed of ultra high molecular weight polyethylene.

4. The improved fluid section of claim 1 wherein the first lip seal further comprises a stainless steel spring having a generally U-shaped cross section to urge the lips of the seal in the radial direction.

5. The improved fluid section of claim 3 wherein the second lip seal further comprises a stainless steel spring having a generally U-shaped cross section to urge the lips of the seal in the radial direction.

6. The improved fluid section of claim 1 wherein the piston is formed of type 440C stainless steel.

7. The improved fluid section of claim 1 wherein the region of the piston in contact with the seal has a surface finish of between about 8 and about 12 microinches.

8. The improved fluid section of claim 1 wherein the housing further comprises a piston guide at the location where the piston exits the housing to maintain concentricity between the piston and the housing.

9. The improved fluid section of claim 1 wherein the multiple lip seal comprises multiple lips on an inside diameter thereof.

* * * * *